United States Patent Office 3,152,865
Patented Oct. 13, 1964

3,152,865
PROCESS FOR PRODUCING A STABLE
ALUMINA MONOHYDRATE
John H. Koch, Jr., Nutley, N.J., assignor to Engelhard
Industries, Inc., a corporation of Delaware
No Drawing. Filed Jan. 6, 1961, Ser. No. 80,994
7 Claims. (Cl. 23—143)

This invention relates to improvements in the preparation of boehmite hydrous alumina and is particularly concerned with a process including contacting alumina monohydrate with a chelating agent as provided by e.g., an organic component containing multi-carboxylate ions, such as a chelating acid or its salt, under aqueous alkaline conditions to prevent transformation of the monohydrate to other forms.

When hydrous alumina is formed from an aqueous solution of an aluminum compound by precipitaton, it can be in the form of a hydrated material, which immediately results in alumina monohydrate (boehmite) plus an unidentified amorphous alumina hydrate. The freshly precipitated alumina monohydrate (boehmite) provides a particularly advantageous form of alumina precursor in catalyst manufacture because when dried and calcined to finished form after incorporation of other catalytically active or promoter material it can result in a base structure of fine crystallite size and high surface area for instance, of about 300 or more square meters/gram when calcined. For example, the boehmite form of alumina precursor is highly desired for the production of an alumina-molybdenum oxide or an alumina-chromia reforming catalyst and may be useful in making alumina-platinum group noble metal, e.g., platinum, reforming catalysts.

Boehmite as commonly formed is usually precipitated from a solution of a water-soluble acid aluminum compound such as aluminum chloride or aluminum sulfate by addition of ammonia or other basic material. It has also been prepared by hydrolyzing an aluminum alcoholate, such as aluminum isopropoxide, with water. Hydrous alumina, i.e., alumina monohydrate gel is formed immediately upon the addition of, for instance, the ammonia to the aluminum chloride solution or water to aluminum isopropoxide.

Depending upon the method of preparation, for instance by the addition of ammonia to a soluble-aluminum compound solution, the hydrous alumina in the form of a highly gelatinous material may contain contaminating elements, ammonium ions or chloride ions, for example. It is often important in catalyst preparation, to remove the contaminating elements or reduce them to very low concentrations by water washing prior to incorporation of catalytically active ingredients such as platinum, molybdenum or chromium. However, it has been found that large percentages of the desired alumina hydrate are lost by peptization when washing is conducted in the usual manner by filtration, reslurrying and refiltration. Also in the case of washing by percolation, most of the alumina hydrate peptizes and goes into colloidal suspension so that it is lost with the wash water. Moreover, washing on a continuous filter, e.g., a rotary filter, becomes exceedingly difficult because the peptized alumina hydrate in colloidal suspension clogs the filter media and makes the suspension virtually unfilterable.

The form of the hydrous alumina as precipitated in an aqueous environment tends to change as the hydrogel ages, i.e., the hydrate tends to be gradually transformed from the monohydrate to one or more trihydrates of alumina. For many purposes, this is disadvantageous since high trihydrate-derived catalysts are generally of lower physical strength and stability.

It has been surprisingly discovered that the above-described procedures can be substantially improved to provide boehmite alumina by contacting alumina monohydrate with a chelating agent under alkaline conditions to prevent transformation of the monohydrate to other forms of alumina hydrate such as alumina trihydrate. At the same time, peptization is prevented so that washing without undue losses of alumina is greatly facilitated. Repeated washing can be employed to reduce the water-soluble contaminating ion, e.g., chloride content, to less than about 0.2 or 0.5% with only minor losses of alumina.

If partial aging of alumina gel containing boehmite to a stabilized amount of trihydrate is desired, this may be accomplished either (1) by adding chelating agent after aging to the desired hydrate distribution, or (2) by adding an amount of chelating agent less than sufficient to stop aging completely at some stage prior to aging to the desired boehmite-trihydrate gel distribution. For example, it may be desired to carry out aging to a stabilized trihydrate content of about 65% to 95%, with the balance being boehmite. Alternatively (2) can be further controlled by not allowing the gel to stand in the aqueous medium any longer than the maximum time required to age the gel to the desired trihydrate content. In this alternative, when the gel is of the desired trihydrate content, it can be dried or additional amounts of the chelating agent can be added to prevent further transformation to the trihydrate form.

The alkaline conditions employed in the present invention include a pH greater than 7 and preferably a pH of about 8 to 9.5. The alumina monohydrate is contacted with relatively small amounts, for instance stabilizing amounts, of the chelating agent to prevent transformation of the monohydrate to other forms. These amounts depend upon the particular chelating agent used and generally range from about 0.5 to 3% based on the alumina on a dry basis, preferably from about 0.5 to 2%. Although larger amounts of the chelating agent can be employed when stabilization is desired over a long period, for instance, several days, no particular advantage has been associated with the use of larger amounts over the usual processing periods, e.g., up to about 8 days. The amounts of chelating agent employed may depend upon the particular agent used. For instance, when the chelating agent is oxalate ion, about 1.5% is usually sufficient whereas a lesser amount of tartrate ion is generally used. When the alumina monohydrate in contact with stabilizing amounts of the chelating agent is to be subjected to additional processing which may result in the removal of chelating agent, e.g., washing procedures to remove contaminating elements, it may be necessary to adjust the initial amounts of chelating agent used in order to maintain stabilizing amounts of the chelating agent in contact with the monohydrate. The chelating agent, however, is generally not as easily removed as the contaminating elements. For instance, when both Cl⁻ and —OOC—COO— (oxalate ion) are present, the latter adheres firmly to the alumina gel and the Cl⁻ is washed out much faster by ammonia water. In the case of base Res. 96 in Example I, while the Cl⁻ concentration was reduced by washing from about 10% to 0.08% (based on $Al_2O_3$) the oxalate ion concentration was reduced from 3.5% to only 2.2%. If the alumina monohydrate is formed by the reaction of aluminum alcoholate and water without resorting to washing, chelating agent removal from the alumina monohydrate is significantly reduced as a factor. Although the particular association between the chelating agent and the alumina monohydrate is not known, it is believed that the chelating agent absorbs firmly on the alumina by its chelate linkage.

The chelating agents employed in the present invention have at least some water solubility and include an organic component containing multi carboxylate ions or a polycarboxylic acid radical and precursors of these ions, e.g., organic polyacids and their corresponding salts. These agents generally contain from about 2 to 10 carbon atoms, preferably from about 2 to 6 carbon atoms. The organic polyacids include the di- and tri-protonic acids, however, the diacids are preferred. Suitable acids include oxalic, tartaric (a hydroxy substituted acid), and citric acids and their salts, preferably their ammonium salts, for instance, ammonium oxalate, ammonium tartrate, and ammonium citrate.

In one embodiment employing the improvement provided by the present invention, the alumina precursor composition is produced from an alumina hydrogel which may be formed by precipitating gelatinous hydrous alumina from a water solution of a soluble, inorganic acid aluminum salt such as aluminum chloride by means of an inorganic base neutralizing or precipitating agent such as ammonium hydroxide. Aqueous ammonium hydroxide can be added to the aluminum chloride solution until a pH of at least about 8 has been reached while stirring the mixture vigorously. Following the precipitation, the precipitate is separated and washed with water in order to obtain the precipitate substantially free of contaminating ions, e.g., chloride ions in the case of aluminum chloride, to a low limit, usually less than about 0.2 weight percent. The washing is generally controlled at temperatures ranging from about 30° F. or ambient temperatures to 190° F., frequently above about 110° F., usually about 130 to 140° F., and at a pH generally within the range of about 7 to 9 or 10. The chelating agent is generally added either with or after the precipitant, e.g., the ammonia solution, employed to precipitate the hydrous alumina, i.e., alumina monohydrate gel, from the water solution of a soluble, inorganic acid aluminum salt, e.g., aluminum chloride solution, or after washing the precipitated gel to a contaminating ion content of, for instance, less than about 25%, for instance, about 25 to 2%. Aging the washed hydrate is substantially avoided by the chelating agent. The term "aging" as employed herein refers to the transformation of the alumina monohydrate to its trihydrate forms. Aging can be promoted under certain conditions, for instance by maintaining the alumina monohydrate in contact with water or allowing it to remain in its precipitated state and in contact with an aqueous medium, although it may be washed, for substantial periods of time, e.g., about 5 to 10 days after Cl⁻ removal. In the present invention, substantial aging of the alumina monohydrate is avoided by contacting the alumina monohydrate with a chelating agent, and to produce a boehmite of high purity (i.e., a boehmite containing negligible amounts of the corresponding forms of dried alumina trihydrate), the alumina monohydrate is generally not subjected to conditions which promote aging over about 12 days and preferably not over about 8 days prior to drying. In some instances undue subjection to aging-promoting conditions prior to drying may result in the conversion of excessive amounts of alumina monohydrate to the trihydrate form. When employed as a catalyst base precursor, the hydrate can be treated with a source of catalytically active material such as platinum, in order to incorporate the catalytic material in finely dispersed condition in the mass, as by precipitating platinum sulfide in situ from chloroplatinic acid with aqueous hydrogen sulfide or as by treating the hydrate composition with a colloidal platinum sulfide sol. The resulting composition is dried and calcined to activated form.

A second embodiment employing the improvements provided by the present invention involves hydrolyzing aluminum alcoholate with water, separating the hydrous alumina from the alcohol, and recovering the alumina from its aqueous slurry. This hydrolysis can be conducted at a temperature in the range of about 32° to 100° F. The chelating agent in stabilizing amounts is generally incorporated in the water and thus is in contact with the resultant alumina monohydrate as it is formed. Here again, the alumina monohydrate is substantially stabilized against aging, is not unduly subjected to conditions promoting aging when a high purity product is desired, and is usually dried and calcined according to known procedures. The aluminum alcoholate generally contains from about 2 to 8 carbon atoms per alcohol radical and can be, for example, aluminum ethylate, isopropylate, or tertiary butyrate, or mixed aluminum alcoholates such as mixed aluminum amylates.

The alumina hydrate produced by the first and second embodiments as improved by the present invention generally contains a predominant amount, e.g., a major amount (for instance, more than about 50 percent and up to about 100 percent) of alumina monohydrate, e.g., boehmite as detected by X-ray analysis after drying. It may also contain for instance, up to about 35 percent, or even in predominant amounts up to about 95 percent, of amorphous hydrous alumina or trihydrate forms as determined by X-ray diffraction analysis of dried samples corresponding to gibbsite, bayerite and randomite (nordstrandite).

The alumina hydrate compositions produced by the process of the present invention can be advantageously employed as the alumina base precursor in a catalyst having a calcined alumina base possessing a number of significant advantages in use as a reforming catalyst or a catalyst for producing aromatics. The finished catalyst contains gamma alumina modifications and has a base structure characterized by large total pore volume, e.g., about .6 to .8 cc./gram, which advantageously permits a material being catalyzed to freely move in and out of the pores. Although the present invention includes stabilizing alumina monohydrate as precursor for activated alumina with intermediate surface areas, for instance about 200 square meters/gram, a high surface area, e.g., greater than about 400 square meters/gram can also be advantageously provided, when the precursor hydrate composition is dried and calcined. The catalyst can contain about 0.1 to 1.5% by weight of a platinum group metal component present in sufficiently finely distributed form as to exhibit by X-ray diffraction analysis the substantial absence of crystallites greater in size than about 50 Angstrom units. Greater amounts of platinum whether detectable or undetectable by X-ray analysis show no advantage justifying the expense. Greater amounts of other catalytically active metals can be employed, however. For instance, chromia or molybdenum oxide can be employed in amounts ranging up to about 15 or more percent based on the dried alumina. The calcined catalyst contains generally upwards of about 2 percent by weight of matter volatile at 1100° C. and if calcined at 900° F. with dry air and cooled with dry air, such volatile matter may constitute from about 2 to about 5% of the weight of the catalyst. The catalysts have favorable reforming activity including high dehydrocyclization activity, low rates of activity decline, good mechanical strength, and can be regenerated by oxidative means.

The platinum group noble metal-alumina catalyst can be prepared by incorporating a platinum group metal through mixing the alumina component with the desired amount of a platinum group noble metal in the form of a soluble or colloidally dispersible compound. For example, chloroplatinic acid may be added to the slurry and precipitated by introduction of hydrogen sulfide in aqueous solution. Alternatively, the platinum may be introduced in the form of a sulfide sol. The platinum-group metal alumina containing composition is dried as by spray, oven or drum drying. The dried composition then may be formed into tablets or pills or may be rewetted and extruded to particles of desired size. The resulting catalyst particles can be calcined by heating to about 800° to 1200° F. or more for a period of about 3 to about 12 hours in an atmosphere of a flowing free oxygen-containing gas. Before use, the catalyst can be reduced by subjecting it to flowing hydrogen at about 800° F. to about 1100° F. for a period up to several hours.

The following examples will serve to illustrate the invention but they are not to be considered limiting.

EXAMPLE I (A)

1.58 liters of $AlCl_3$-distilled water solution (equivalent to 13% or 2.0 kg. of $Al_2O_3$) was diluted with 24 liters of distilled water and stirred with a wooden propeller in a stoneware container. 40 grams of oxalic acid were dissolved separately in 16 liters of 1:1 $NH_4OH$ solution (equivalent to 14% $NH_3$).

This solution was added to the stirring $AlCl_3$ solution at a rate of about 400 cc. per minute. The slurry thickened after 28.5 minutes at a pH of 5.7, at which time the ammonia addition was cut off. After 21 minutes additional stirring the slurry was again fluid and a further amount of ammonia was added until the pH reached 8.0. The total volume of added $NH_4OH$ and oxalate was 14.5 liters, so that the calculated amount of oxalic acid based on $Al_2O_3$ was 1.82%.

The slurry was washed overnight on a rubber filter press to reduce the chloride content to a low level. After the washing the cake was reslurried and its pH adjusted from 6.7 to 9.3 with 1.0 liter of 1:1 $NH_4OH$. The slurry was again washed overnight and the cake reslurried with adjustment of pH from 9.0 to 9.3 with 54 cc. of 1:1 $NH_4OH$. After the third washing the residual chloride was 0.33%. The slurry was then allowed to stand for five days at which time the boehmite content was 39% and the trihydrate content 22%.

This result indicates that the remaining amount of oxalate after washing was insufficient to prevent trihydrate formation.

(B)

Aluminum chloride was reacted with ammonia water by a method similar to the aforesaid Example I(A) and washed to produce a filter cake containing about 10% Cl. This was slurried, treated with oxalic acid to yield 3.5% oxalate ion based on $Al_2O_3$. Three additional washes on the rubber filter press resulted in a chloride content of 0.08% and a remaining quantity of oxalate of 2.2%. This material after aging for three days contains 74% boehmite and 0% trihydrate. The slurry at a pH of 9.1 was treated with $H_2PtCl_6$ (reducing the pH to 8.6) to produce a 0.6% Pt catalyst; subsequently $H_2S$ water was added lowering the pH to 7.8. The material was drum dried, extended through a 1/16" die and calcined with dry flowing gas at a temperature of 480° C. The calcined catalyst was designated K705 or "A."

The surface area of this catalyst as determined by small angle X-ray scattering was 418 square meters per gram, a high area although somewhat lower than RD–150 catalysts. RD–150 catalysts are commercial 0.6% platinum-alumina catalysts exhibiting excellent naphtha reforming characteristics. The alumina employed in the RD–150 catalysts is derived from an alumina containing generally from about 65 to 95 percent alumina trihydrate. The RD–150 catalyst is referred to herein as establishing a "standard" for the comparison of characteristics of catalysts prepared by methods employing the procedures of the present invention. After heating 16 hours at 1150° F. in a flowing stream of air with water vapor pressure about 25 mm. of Hg, the area of catalyst A was 275, which compares with about 200 for similarly treated RD–150 catalysts.

The addition of oxalate to unaged base, preventing trihydrate formation, has interesting effects on the physical properties of catalysts prepared, for example, in connection with catalyst K705. Here the calcined crushing strength of the catalyst was 14 lbs. and this is normal for catalysts of this type wherein the alumina is prepared by the present invention; however, after further heating at 620° C. this crushing strength increased to 17 lbs., whereas a trihydrate precursor catalyst (RD–150) by the same treatment would have its crushing strength reduced by about half. The surface area of this catalyst is remarkably high, i.e., 418 m.²/g. for boehmite-precursor material. Also, the total pore volume is high, i.e., .678 cc./g., as compared to about .560 for typical trihydrate precursor catalysts. Volatile matter at 1100° C. was 3.66% and crystalline platinum did not show in an X-ray examination.

Catalyst K705 was subjected to a reforming test under conditions of 960° F., 200 pound presure, 3 WHSV, and 10:1 $H_2$ to hydrocarbon mol ratio yielding the following data:

| | |
|---|---|
| RON at 0/12 hours | 102.8 |
| RON at 84/96 hours | 99.5 |
| Yield at 0/12 hours | 71.8 |
| Yield at 84/96 hours | 78.4 |
| Aniline point at 0/12 hours | 23.6 |
| Aniline point at 84/96 hours | 30.9 |

The feed treated was about 38 Research Method Octane (neat) Mid-Continent straight run naphtha typically of 246° to 3590° F. ASTM distillation boiling point range and analyzing:

| | Percent |
|---|---|
| Paraffins | 46.7 |
| Olefins | 1 |
| Naphthenes | 44.8 |
| Aromatics | 8.3 |

These results are very favorable for the naphtha reforming reaction.

EXAMPLES II TO VIII

Examples II to VIII, described in tabular form in Table I, provide aluminas which were prepared in essentially the same manner as the alumina of Example I, except for the modifications presented below in Table I under the heading "Description." Data on Examples I(A) and I(B) are also included in this table.

Table I

| Example | Alumina Base Designation Res. | Percent Additive Al₂O₃ Basis | Description | Slurry, Days Aged | Kgs. Al₂O₃ | Final Percent Cl | X-Ray Alumina | |
|---|---|---|---|---|---|---|---|---|
| | | | | | | | Boehm. | Trihy. |
| I(A) | 123 | 1.82% oxalate ion | AlCl₃ solution is precipitated with NH₄OH containing oxalate, and washed. | 5 | 2.0 | .33 | 39 | 22 |
| I(B) | 96 | 3.5% oxalate ion | Filter cake washed to about 10% Cl, treated with H₂C₂O₄·2H₂O solution, and washed further. | 3 | 3.5 | .08 | 74 | 0 |
| II | 97 | 1% oxalate ion | Similar to 96 except 5.4% Cl at addition. | 3 | | .06 | 58 | 10 |
| III | 99 | 0.1% oxalate ion | Similar to 97 except 1.9% Cl at addition. | 8 | | .2 | 57 | 20 |
| IV | 108 | 1.54% oxalate ion | Similar to 96. Blend with 109 | (4) | 1.8 | .02 | 50 | 28 |
| V | 109 | 2% oxalate ion | Similar to 96. Blend with 108 | (4) | 3.1 | .41 | | |
| VI | 110 | 0.5% tartrate ion | Similar to 1 except for tartaric acid. | (4) | 3.1 | .09 | 64 | 23 |
| VII | 117 | 1% oxalate ion | An aliquot sample of solidified Al isopropoxide is hydrolyzed with water containing oxalic acid to gel pH of 9.0. | (1) | | | 77 | 0 |
| VIII | 122 | 1.2% tartrate ion | Same as 117 except tartaric acid is used. Gel pH 8.8. | (1) | 1.7 | | 77 | 0 |

EXAMPLE IX

The base, Base 97, of Example II was used as the alumina in the preparation of a platinum-alumina catalyst containing 0.6 percent platinum in essentially the same manner described in Example I(B).

The calcined catalyst was designated K719. Its surface area was 398 square meters per gram, which was reduced to 261 after heating 16 hours at 1150° F. in contact with moist, flowing air as described in Example I(B). Its crushing strength was 20 lbs., which reduced to 15 lbs. after the 1150° F. heating. Total pore volume was .658 cc./g. and volatile matter at 1100° C., 3.53%. No crystalline Pt was disclosed by X-ray examination.

It is claimed:

1. In the production of alumina monohydrate compositions by a process comprising the formation of an alumina hydrogel consisting essentially of a predominant amount of alumina monohydrate by the addition of an inorganic neutralizing base to an aqueous solution of an acid inorganic aluminum salt, with washing of the hydrogel with water until substantially free of contaminating ions, the method of alumina monohydrate stabilization against conversion to other hydrate forms of alumina which comprises contacting an aqueous slurry of the hydrogel under alkaline conditions with about 0.5 to 3.0%, based on the alumina on a dry basis of a water-soluble chelating organic component of 2 to 10 carbon atoms containing multi-carboxylate ions, the pH of said slurry after contact with the chelating agent being greater than 7, and in an amount sufficient to stabilize the alumina monohydrate against transformation to other forms of alumina without peptization of said alumina monohydrate.

2. In the production of alumina monohydrate compositions by a process comprising the formation of alumina hydrogel consisting essentially of a predominant amount of alumina monohydrate wherein the alumina hydrogel is formed by the hydrolysis of aluminum alcoholate, the method of alumina monohydrate stabilization against conversion to other hydrate forms of alumina which comprises contacting an aqueous slurry of the hydrogel under alkaline conditions with about 0.5 to 3.0%, based on the alumina on a dry basis of a water-soluble chelating organic component of 2 to 10 carbon atoms containing multi-carboxylate ions, the pH of said slurry after contact with the chelating agent being greater than 7, and in an amount sufficient to stabilize the alumina monohydrate against transformation to other forms of alumina and without peptization of said alumina monohydrate.

3. In the production of alumina monohydrate containing compositions by a process which comprises forming an aqueous slurry of alumina hydrogel consisting essentially of alumina monohydrate, the step of stabilizing the alumina monohydrate which comprises contacting the hydrogel slurry under alkaline conditions with about 0.5 to 3%, based on the alumina on a dry basis, of a water soluble chelating organic component of 2 to 10 carbon atoms containing multi-carboxylate ions, the pH of said slurry after contact with the chelating agent being greater than 7, and said amount being sufficient to stabilize the alumina monohydrate against transformation to other forms of alumina without peptization of said alumina monohydrate.

4. The process of claim 3 wherein about 0.5 to 2% of the chelating organic component containing multi-carboxylate ions is employed and the alkaline conditions include a pH of about 8 to 9.5.

5. The method of claim 3 wherein the alumina hydrogel is formed by contacting aluminum chloride and ammonium hydroxide in an aqueous medium.

6. The method of claim 4 wherein the alumina hydrogel is formed by hydrolyzing aluminum isopropoxide with water.

7. The method of claim 5 wherein the chelating component is selected from the group consisting of tartrate ion and oxalate ion.

References Cited in the file of this patent

UNITED STATES PATENTS

| | | |
|---|---|---|
| 1,935,178 | Connolly | Nov. 14, 1933 |
| 1,976,875 | Connolly | Oct. 16, 1934 |
| 2,762,783 | Kimberlin | Sept. 11, 1956 |
| 2,894,915 | Keith | July 14, 1959 |
| 2,898,307 | Keith | Aug. 4, 1959 |

FOREIGN PATENTS

| | | |
|---|---|---|
| 1,072,976 | Germany | Jan. 14, 1960 |
| 1,231,278 | France | Sept. 28, 1960 |